Jan. 8, 1924.
A. A. PARKER
1,480,297
FLUID PRESSURE CONTROLLING MEANS
Filed Dec. 28, 1922
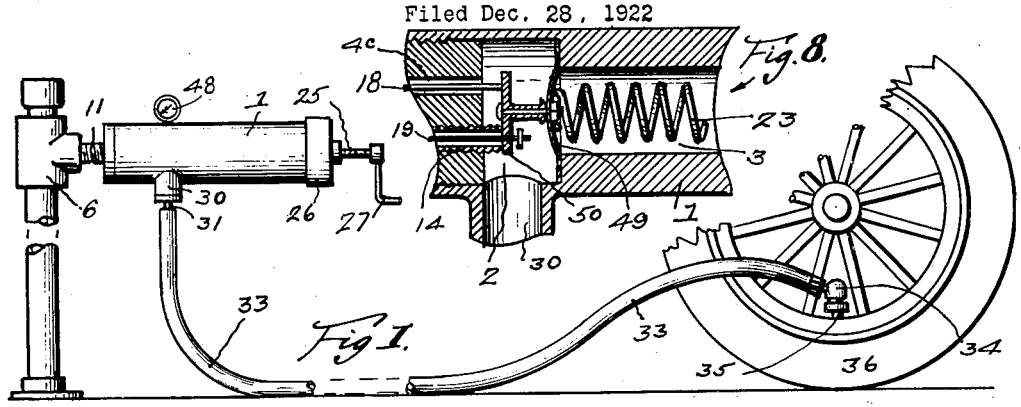
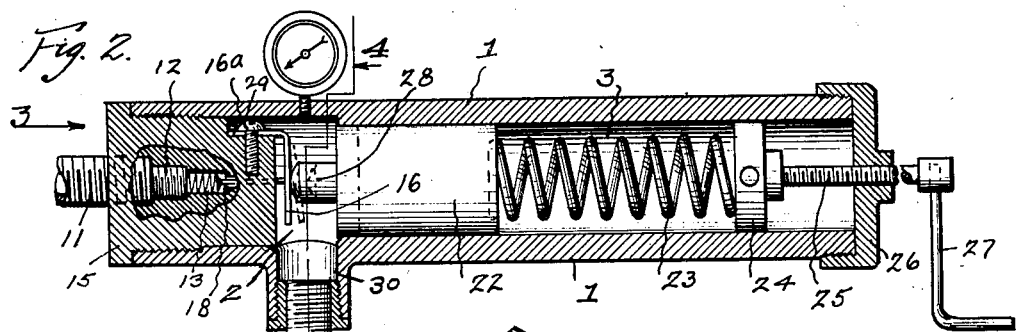
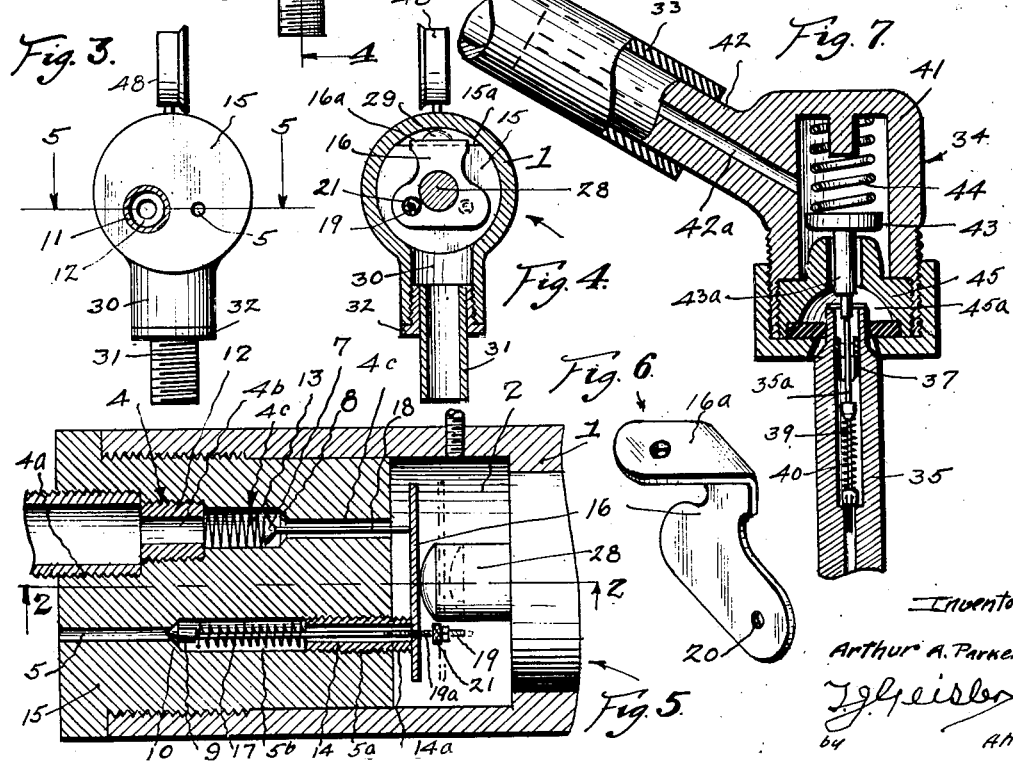
Inventor.
Arthur A. Parker Patented Jan. 8, 1924.

1,480,297

UNITED STATES PATENT OFFICE.

ARTHUR A. PARKER, OF PORTLAND, OREGON.

FLUID-PRESSURE-CONTROLLING MEANS.

Application filed December 28, 1922. Serial No. 609,498.

*To all whom it may concern:*

Be it known that I, ARTHUR A. PARKER, a citizen of the United States, and a resident of Portland, county of Multnomah, and State of Oregon, have invented a new and useful Improvement in Fluid-Pressure-Controlling Means, of which the following is a specification.

The object of my invention is to provide means for controlling the pressure at which fluid is delivered from a source under a head.

Specifically my invention relates to the inflation of the inner tubes of automobile tires. In this connection my invention has for its object the providing of a device which shall control the pressure at which the tire is inflated. Thru the medium of my device the air may be applied to the tire without first having to test the pressure in the latter; nor is it necessary to see to it that the tire is not over inflated. With my device set at a given pressure the source of air under pressure is simply connected to the valve of the inner tube of the tire; and when the pressure in the inner tube is below such given pressure it will be brought up to it; or, if the pressure in the inner tube is in excess of the given pressure it will be reduced. For, when the predetermined pressure has once been attained in the inner tube it can not be brought above that point; because the device is closed by this predetermined pressure.

I attain my object by a device comprising a chamber provided with an inlet and an escape port, the former being connected with a source of fluid under a head. The valves control said ports respectively and in the chamber is provided a member movable by the fluid pressure in the chamber, and this member is connected to said valves so as to position the latter relatively to the position of said member, in other words, permitting air from the head to enter the chamber as fast as the supply in the latter is withdrawn or permitting air to escape from the chamber when the pressure is in excess to that at which the device is set. The chamber is provided with an outlet having a tube to the free end of which is attached a hose connection adapted, for example, for being applied to the valve of the inner tube of a tire; and to open this valve in the usual manner.

The details of my invention are hereinafter more fully described with reference to the illustrations in the accompanying drawings.

In the latter:

Fig. 1 is an elevation of my pressure regulating mechanism with a hose connected thereto and connected to an automobile tire;

Fig. 2 is a longitudinal section of my mechanism taken on the line 2—2 of Fig. 5 with a part broken away to show details of construction;

Fig. 3 is an end elevation taken in the direction of the arrow 3 of Fig. 2;

Fig. 4 is a section taken on the line 4—4 of Fig. 2;

Fig. 5 is a section taken on the line 5—5 of Fig. 3;

Fig. 6 is a perspective view showing a detail of construction;

Fig. 7 is a view partly in section, of a hose connection fitted over the tube valve of a standard automobile; and Fig. 8 is a fragmentary section showing a slightly different arrangement of parts by which my objects may be accomplished.

My device is made up with a hollow body 1, which provides a chamber 2 therein. A cylindrical extension 3 is connected to this chamber. This chamber 2 is provided with an inlet port 4 and an outlet port 5. The inlet port is connected with a source of fluid under pressure, as for example the standpipe 6 which may be connected to a compressor (not shown). The inlet port is controlled by a valve 7 which seats on a shoulder 8 and thus closes the inlet port. The outlet port is controlled by a valve 9 which seats on the shoulder 10. The inlet port 4 is made with different diameters, $4^a$ being the largest, thus adapted to receive the pipe 11. The part $4^b$ is made slightly smaller and is threaded so as to accommodate a nipple 12. $4^c$ is made slightly smaller and provides a chamber in which the valve spring 13 is seated. This valve spring bears with one end against the valve 7 and the other end bears against the nipple 12 and the spring thus tends to hold the valve shut and seated on the shoulder 8, thus preventing fluid from passing thru this port.

The port 5 is also made in varying diameters, the portion $5^a$ being the largest and made to accommodate the nipple 14. This nipple 14 extends only part way into the head 15 and the portion of the nipple $14^a$ extends without the head and thus provides a seat against which the resilient clip 16 may seat. The portion 5ᵇ of the port 5 provides a chamber for the spring 17. One end of this spring bears against the end of the nipple 14 and the other end bears against the valve 9 and tends to hold the valve on its seat. The valve 7 has a rod 18 which projects into the chamber. The clip 16 is so designed that the stem 18 abuts against the clip and the stem 19 passes loosely thru the hole 20 in the clip 16. The stem 19 is threaded as at 19ª and has a nut 21 which provides a shoulder which causes the valve 9 to be pulled off its seat when this resilient clip 15 moves towards the cylindrical extension more than a certain distance.

A piston 22 works in this cylindrical extension 3 and has a compression spring 23 mounted behind it which tends to move the piston towards the chamber 2. The compression in this spring is varied by moving the follower 24 longitudinally in this extension. The follower 24 is rotated by means of a crank 27. The piston has a projection 28 which normally bears against the clip 16. The bent over portion 16ª of the clip 16 is fastened to the head 15 at one side as 15ª by means of a screw 29. This clip is resilient and tends to return to a flat position so that the clip will lie in one plane and thus if the plunger moves away from the chamber 2 back into the extension 3 the clip will follow the extension 28 and bear on the same at all times. The chamber 2 has an orifice 30 which is tapped by a nipple 31 which is fastened to the bushing 32. A tube 33 is fastened thereto and has a hose connection 34 on its end. This hose connection is adapted to fit over a tube valve 35 of a standard automobile tire 36.

One standard type of automobile tube valve is made with a core 35ª which is held in place by a threaded tubular piece 37. The hole in this tubular piece 37 is closed by a valve 38. This valve is made integral with the valve stem 39 which extends thru this tubular piece and beyond the extremity of the valve 35. The valve is held seated on the opening in this tubular piece 37 by a spring 40. The valve can be forced off its seat on this tubular piece by pressing the valve stem downward which permits the air to pass thru the tubular piece 37. This is merely an ordinary type of tube construction and forms no part of my invention.

The hose connection is made with cupped head 41 which has an integral neck 42 on which the hose 33 can be fastened. The neck has a longitudinal bore 42ª thru which air can pass from the cupped head to the hose. A circular piece 45 with a hole 45ª in its middle is recessed in the open part of the cupped head.

The valve 43 seats on the hole 45ª and thus opens and closes this outlet 42ª. This valve 43 is held on its seat by the spring 44. The stem 43ª of the valve 43 extends thru this outlet 45ª so that by forcing the tube valve into the cupped head it opens a passage between the chamber within the cupped head and the tire. The piece 45 is made so as to accommodate the end of the automobile tube valve and a gasket is fitted in the head so as to prevent leakage when the tube valve is in place in the hose connection. A portion of the stem 43ª is made smaller as at 47 so that it will fit within the shell of the valve 35 and thus force the valve stem 39 downward so as to lift the valve 38 off its seat within the tube valve. A pin 48 is fastened thru the valve stem 43 and provides a shoulder which bears on the extremity 35ª of the valve 35. When the connection is forced over the valve 35 this pin strikes the extremity 35ª and forces the valve 43 off its seat and at the same time the extremity 47 fits within the shell of the valve 35 and forces the valve 38 off its seat. This permits the air to flow freely from the tire tube to the hose connection or vice versa as both of these check valves are lifted from their seats as long as the hose connection is fastened over the tube valve.

In Fig. 8 I show how it is possible to construct my device without the use of a piston. I arrange a flexible diaphragm 49 across the bore of the cylindrical extension 3. The coil spring 23 bears on one side and a T-head valve control 50 is pivotally mounted on the other. The valve stems 18 and 19 abut and extend thru this control member similarly as they do with the clip 16.

As the diaphragm is forced inwardly or outwardly from the cylindrical extension thus also are the valves moved on and off their seats. Thus, if the fluid pressure on one side of the diaphragm is greater than the set pressure of the spring, the fluid pressure will be reduced thru the outlet valve and if the fluid pressure is less, the movement of the diaphragm will open the inlet valve and close the outlet valve.

The action of my pressure regulating device is as follows: The spring 23 is compressed by rotating the handle 27 and this adapts my pressure regulator to resist the amount of pressure desired. This compression forces the plunger 22 towards the chamber 2 and compresses the air therein and the resultant pressure can be read on the gage 48. The pressure of fluid which passes from the stand pipe 6 is always greater than the pressure desired in the tire and thus the pressure within the chamber 2 will never tend to escape back into the stand pipe. The hose connection is then fitted over the tube of the automobile tire and manually pressed downward. This manual pressure not only unseats the valve in the hose connection but also the valve in the tire tube, as previously explained. If the pressure in the automobile tire is not as high as the pressure set in the device, air will immediately flow thru the tube into the tire. This will deplete the air in the chamber 2 and thus will cause the pressure to decrease. The lowering of the pressure in the chamber 2 permits the plunger 22 to move further into the chamber and it presses the flexible clip 16 downward and thus in turn presses the valve stem 18 until it causes the valve 7 to be unseated from the shoulder 8 in the inlet port to the device. This permits more air to enter from the stand pipe. Air will continue to flow until the pressure in the device balances the spring 23. This balancing of the pressure in the device will cause the plunger 22 to be moved backward and thus the force is removed from the spring 16, this spring being resilient and with a tendency to flex so as to return to a flat position will thus follow the plunger as it recedes in the extension 3.

The spring 13 will then force the valve 7 so that it will seat on the shoulder 8 and thus stop the inlet port 4. If, on the other hand, when the connection is fastened over the tire valve, the tire has a higher pressure than that for which the device is set, the excess will be permitted to flow thru the hose connection and into the chamber 2. This will cause the pressure within the chamber to compress the spring 23 and this will permit the clip 16 to move backward following the projection 28. This will lift the valve 9 off its seat 10 and permit the excess pressure to pass out thru the outlet port. When the pressures are balanced the plunger 22 will move back to its normal position holding both valves closed and the pressure in the tire will be equal to the pressure in the device.

I claim:

1. A device of the character described, comprising a chamber provided with an inlet port and an escape port, the inlet port being adapted to be connected with a source of fluid under pressure, valves controlling said ports respectively, a member movable in said chamber by the pressure in the latter, means between such member and said valves adapted to position the latter relatively to the position of said member, said chamber provided with an outlet orifice, a tube connected thereto, a hose connection at the free end of said tube, said hose connection having an outlet bore, a valve controlling the latter.

2. A device of the character described, comprising a chamber provided with an inlet port and an escape port, the inlet port being adapted to be connected with a source of fluid under pressure, valves controlling said ports respectively, a member movable in said chamber by the pressure in the latter, means between such member and said valves adapted to position the latter relatively to the position of said member, said chamber provided with an outlet orifice, a tube connected thereto, a hose connection at the free end of said tube, said hose connection having an outlet bore, a valve controlling the latter, this valve having a stem adapted to enter the bore of the neck of a tire valve, or the like, and being adapted to be opened by contact with the stem of such valve.

3. The combination set forth in claim 2 distinguished in that the stem of the valve of the hose connection is also provided with a shoulder adapted for seating on the rim of the neck of the tire valve thereby opening the valve of the hose connection.

4. The combination set forth in claim 2 distinguished in that it includes further a spring tending to close the valve of the hose connection.

5. The combination set forth by claim 4 distinguished in that the stem of the valve of the hose connection is also provided with a shoulder adapted for seating on the rim of the neck of the valve thereby opening the valve of the hose connection.

6. A device of the character described, comprising a chamber having a cylindrical extension, said chamber provided with an inlet port and an escape port, the inlet port being adapted to be connected to a source of fluid under pressure, valves controlling said ports respectively, said valves being normally closed and each having a stem projecting into said chamber parallel with the axis of its cylindrical extension, a piston in said extension, means between said piston and the stems of said valves adapted to position the latter relatively to the position of the piston, means for imposing a resistance to the movement of said piston by the pressure in said chamber, said chamber provided with an orifice, a tube connected thereto, a hose connection at the free end of said tube, and a valve in the hose connection, adapted to be opened in the manner described.

7. The combination set forth in claim 6 distinguished in that the resistance to the movement of said piston is variable.

8. The combination set forth in claim 6 distinguished in that the means between the stems of said valves and said piston is variable for the purpose set forth.

9. A device of the character described, comprising a chamber having a cylindrical extension, said chamber provided with an inlet port and an escape port, the inlet port being adapted to be connected to a source of fluid under pressure, valves controlling said ports respectively, said valves being normally closed and each having a stem projecting into said chamber parallel with the axis of its cylindrical extension, a piston in said extension, means between said piston and the stems of said valves adapted to position the latter relatively to the position of the piston, a compression spring arranged to resist the movement of said piston by the pressure in said chamber, said chamber provided with an orifice, a tube connected thereto, a hose connection, at the free end of said tube, and a valve in the hose connection, adapted to be opened in the manner described.

10. A device of the character described, comprising a chamber having a cylindrical extension, said chamber provided with an inlet port and an escape port, the inlet port being adapted to be connected to a source of fluid under pressure, valves controlling said ports respectively, said valves being normally closed and each having a stem projecting into said chamber parallel with the axis of its cylindrical extension, a piston in said extension, means between said piston and the stems of said valves adapted to position the latter relatively to the position of the piston, a disk longitudinally movable in said cylinder, a spring between the piston and said disk, and means for moving said disk and thus to vary the compression of said spring, said chamber provided with an orifice, a tube connected thereto, a hose connection, at the free end of said tube, and a valve in the hose connection, adapted to be opened in the manner described.

ARTHUR A. PARKER.